Sept. 3, 1940.  E. L. MAGGIONI  2,213,225
EDUCATIONAL APPLIANCE
Filed May 3, 1939

Inventor
Elizabeth L. Maggioni

By

Attorney

Patented Sept. 3, 1940

2,213,225

UNITED STATES PATENT OFFICE 2,213,225

EDUCATIONAL APPLIANCE

Elizabeth L. Maggioni, Boston, Mass.

Application May 3, 1939, Serial No. 271,449

3 Claims. (Cl. 35—31)

This invention is an educational appliance designed for students to use in practicing and testing themselves in arithmetical or other problems. It provides an efficient and economical device whereby teachers may test student's work.

It also provides a simple and economical means for repeated practice in problems which the student or teacher can quickly check.

The objects of this appliance generally stated, are:

1. To provide a problem sheet having a number of openings, with problems written adjacent to said openings; the answers to these problems being written through the openings on a work sheet placed under the openings.

2. To provide an answer sheet with the same problems in the same order, together with the answers to said problems, and having similar openings, said answer sheet being manipulatable with respect to the problem sheet so that its said openings are brought in alignment with the openings in the problem sheet; this answer sheet to be so attached to the problem sheet that it may be moved into position directly under the problem sheet and not be visible to the student when working the problems.

3. To provide an answer sheet for marking said problems which will automatically be in position for marking problems on student's work sheets.

Figure 1:
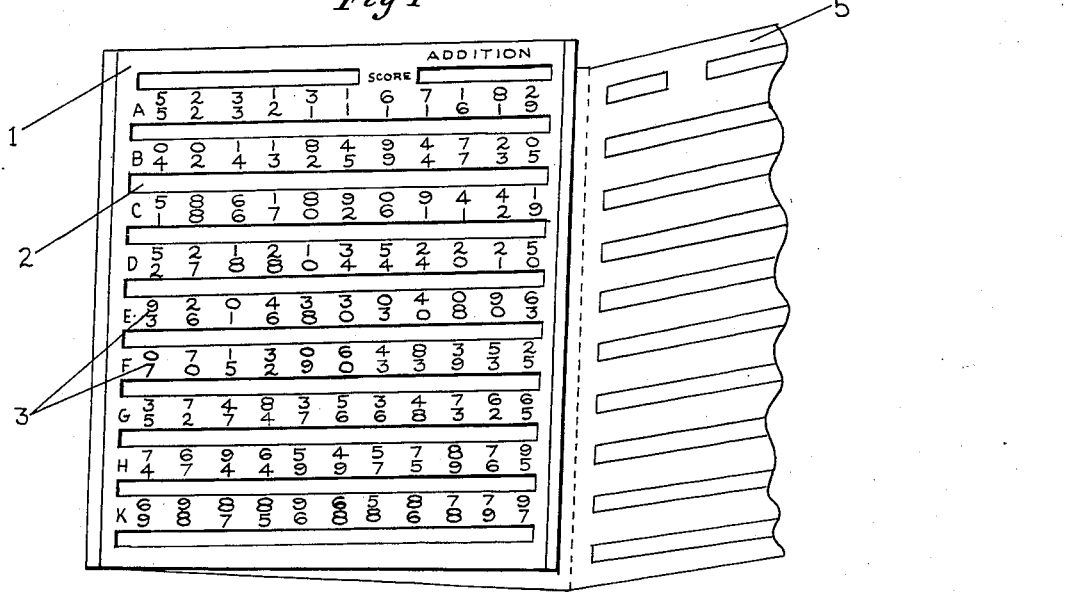
Figure 2:
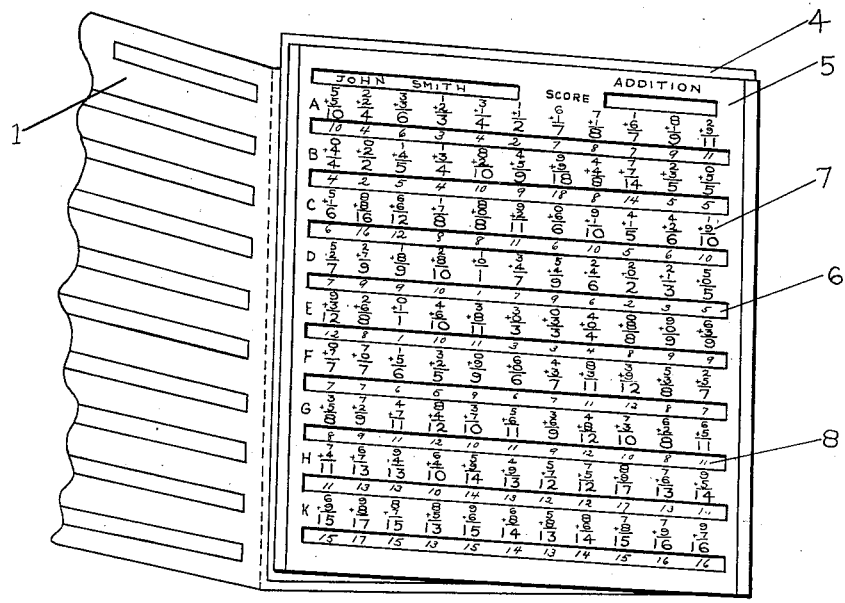

In the accompanying drawing:

Fig. 1 is a view of the appliance of the invention showing the problem sheet with problems written adjacent to the openings in position overlapping the central supporting member, with a portion of the answer sheet opened to show its three-fold construction, and Fig. 2 is a similar view of the appliance of the invention showing the answer sheet in position for checking with the answers written on the work sheet, and with a portion of the problem sheet opened to show its construction.

Referring more particularly to the drawing, what I call a central supporting portion or member is provided and this has hinged to opposite side edges thereof sheets 1 and 4 which are adapted to swing between positions overlapping the central sheet and positions away therefrom. Preferably the device of the invention is formed of a unitary sheet of foldable material to have the parts mentioned.

The outer overlapping problem sheet, denoted by 1, is provided with a plurality of spaced openings, 2, adjacent to spaced problems 3 thereon so that the answers to such problems may be written through the openings on a work sheet which will be placed thereunder.

In Fig. 2 is shown the student's work sheet, denoted by 4, as it will appear after the answers have been written on it through the openings. By turning the problem sheet, 1, as shown in Fig. 2, the answer sheet, 5, with openings, 6, and with the same problems together with the answers, 7, will be visible and will automatically be in the correct position for marking the answers, 8, on the student's work sheet; said answers as well as the problems being written adjacent to the openings.

In using this appliance, the work sheet is placed on the center portion, with the answer sheet and problem sheet overlapping each other; the problem sheet being outermost and the answer sheet not being visible when in this position for working.

The student then solves the problems, writing his answers through the aligned openings in both overlapping sheets on to his work sheet.

When the problems have been completed, the student or teacher turns back the problem sheet, making visible the answer sheet which will automatically be in the correct position for marking; the correct answers appearing adjacent to the student's answers, thus enabling either student or teacher to detect errors quickly.

This appliance can be used repeatedly, making it an economical device and also a time-saving device, since the necessity of writing problems is eliminated and since the answer sheet is always in the correct position for marking the work sheet.

I claim:

1. An educational device of the class described comprising in combination, a supporting member, a sheet member bearing indicia constituting one or more answers hinged to one end thereof for swinging to and from a position overlying the upper face thereof, and a sheet member bearing indicia constituting one or more questions hinged to an opposite end thereof for swinging to and from a position overlying the upper face of said answer sheet member when the latter overlies said supporting member, said sheet members being provided with apertures which coincide when the sheet members are in overlapping relation.

2. An educational device of the class described comprising in combination, a central support member, and sheet members attached thereto adjacent opposite sides thereof for swinging to and from positions overlying the upper face of said support member, one of said sheet members bearing problem indications and the other bearing indications of solutions of said problems, said sheet members being provided with apertures which coincide when the sheet members are in overlapping relation and said indications being located on the sheet members closely adjacent their respective openings.

3. An educational device of the class described consisting of a unitary sheet of foldable material folded to have a relatively flat central portion for supporting a work sheet and side portions hingedly connected to opposite ends thereof so as to be swingable to and from positions overlying the upper face of said central portion, said side portions being provided with apertures which coincide with one another when the side portions are in overlapping relation, each of said side portions being provided with indications on its upper face located adjacent said apertures therein which relate to correspondingly located indications on the other side portion.

ELIZABETH L. MAGGIONI.